(12) United States Patent
Philipp

(10) Patent No.: US 6,766,452 B1
(45) Date of Patent: Jul. 20, 2004

(54) METHOD OF CHECKING THE AUTHENTICITY OF AN ELECTRIC CIRCUIT ARRANGEMENT

(75) Inventor: Stefan Philipp, Hamburg (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/297,414
(22) PCT Filed: Aug. 27, 1998
(86) PCT No.: PCT/IB98/01332
    § 371 (c)(1),
    (2), (4) Date: Apr. 29, 1999
(87) PCT Pub. No.: WO99/12121
    PCT Pub. Date: Mar. 11, 1999

(30) Foreign Application Priority Data

Aug. 29, 1997 (DE) .......................................... 197 37 693

(51) Int. Cl.[7] .................................................. H04L 9/00
(52) U.S. Cl. ........................... 713/168; 713/194; 902/4; 902/28; 714/736; 714/737; 714/739; 324/422; 324/523
(58) Field of Search ................................. 713/168, 194; 902/4, 28; 714/736, 737, 739; 324/422, 523

(56) References Cited

U.S. PATENT DOCUMENTS 4,357,703 A * 11/1982 Van Brunt .................... 371/15
4,904,851 A    2/1990 Yukino ....................... 235/379
6,088,450 A *  7/2000 Davis et al. .................. 380/25

* cited by examiner

Primary Examiner—Matthew Smithers
Assistant Examiner—Paul Callahan
(74) Attorney, Agent, or Firm—Kevin Simons

(57) ABSTRACT

A method of checking the authenticity of a digital electric circuit arrangement is achieved in that a concatenation (6; 8, 9) of at least a few circuit-technical elements (10) of the electric circuit arrangement (1) is formed, which deviates from the normal, intended use of the circuit arrangement (1), in that a digital random value generated by the external device (2) and transferred to the electric circuit arrangement (1) is modified in said circuit arrangement by the concatenated elements (6; 8, 9) and transferred to the external device (2), in that the external device (2) compares the modified value with a check value assigned to the random value transferred to the electric circuit arrangement (1), and in that the authenticity of the electric circuit arrangement (1) is recognized only when the modified value and the check value correspond to each other.

9 Claims, 1 Drawing Sheet

METHOD OF CHECKING THE AUTHENTICITY OF AN ELECTRIC CIRCUIT ARRANGEMENT

BACKGROUND OF THE INVENTION

The invention relates to a method of checking the authenticity of a digital electric circuit arrangement, in particular an integrated circuit arrangement, comprising a data exchange between the electric circuit arrangement and an external device.

For example, U.S. Pat. No. 4,904,851 discloses a system in which a data exchange takes place between an external device, for example a card terminal, and an electric circuit, for example in a card comprising an IC, which data exchange serves to determine whether the user of the electrical card is authorized to perform actions via the terminal. In this known system, a random number is transferred from the terminal to the card, where it is subjected to a predetermined function. Also in the terminal, the same number is subjected to the same function. The results are compared and only if they correspond to each other, the user of the card is given an authorization. Consequently, in such systems the electric circuit arrangement provided in the card is used to perform a predetermined function so as to establish the authenticity of the card.

It is further known that, in the manufacture of electric circuit arrangements comprising a plurality of individual circuits, these circuits, contrary to their normal function, are connected in series. In the manufacture, this series connection is used to check whether the circuits in the electric circuit arrangement function completely and properly.

In systems such as those known from U.S. Pat. No. 4,904,851, there is the problem that copies of the electric circuit arrangement provided on the card exist, which copies perform the same function, so that the external device, in this case the terminal, gives the user authorization although the user is not authorized because the electric circuit arrangement on the card is only a copy. Although this copy fulfills the function, that is it subjects the random number which it has received to the proper function and hence supplies the correct result, it is not authorized to use the terminal because it is only a copy, i.e. a forgery.

SUMMARY OF THE INVENTION

Therefore, it is an object of the invention to provide a method by means of which such forged cards, which in their normal function fulfill the same functions as a real card, can be checked for authenticity, i.e. a method which enables forged cards to be identified even when, in their normal function, they perform all the right functions.

In accordance with the invention, this object is achieved in that a concatenation of at least a few circuit-technical elements of the electric circuit arrangement is formed, which deviates from the normal, intended use of the circuit arrangement, in that a digital random value generated by the external device and transferred to the electric circuit arrangement is modified in said circuit arrangement by the concatenated elements and transferred to the external device, in that the external device compares the modified value with a check value assigned to the random value transferred to the electric circuit arrangement, and in that the authenticity of the electric circuit arrangement is recognized only when the modified value and the check value correspond to each other.

Contrary to the normal function of the electric circuit arrangement, in the method in accordance with the invention, at least a few circuit-technical elements are concatenated. Also other elements, for example purely functional elements, may be included in this concatenation operation. It is of essential importance that the concatenation differs from the standard function of the circuit arrangement and that it is used to change a random value supplied by an external source. The structure of the electric circuit arrangement or of the circuit-technical elements influences said change, i.e. the type of change of the random value is governed by the structure of the circuit. Consequently, in addition to the normal function of the circuit, which is capable of subjecting a random value supplied by an external source to a specific function, a further check is carried out to determine whether the structure of the card corresponds to that of a real card or whether it comprises other circuit-technical elements or differently structured circuits, which cause a random value supplied by an external source, which value is changed by concatenating the circuit-technical elements, to be changed in a manner which differs from that of a real, unadulterated card.

The random value modified by the concatenated elements is retransferred to the external device, which compares the value with a check value, which is stored in the external device and assigned to the random value previously transferred to the electric circuit arrangement by the external device. Only when these values correspond to each other, it can be safely assumed that the card is unadulterated and authentic.

Dependent upon the number of circuit-technical elements or other elements involved in the concatenation, the exactness of this authenticity test can be influenced.

Electric circuit arrangements which are copies and which satisfactorily perform their normal functions can still be recognized by the method in accordance with the invention when they demonstrate a different hardware structure and a different functional structure. This enables copies which are not fully identical with the originals, which applies to almost all copies, to be recognized.

The invention can be advantageously used, for example, for security functions for Smart Card ICs, for chip identifications and, in general, for authenticity checks.

In accordance with an embodiment of the invention, the concatenation advantageously not only includes circuit-technical elements but also logic elements of the electric circuit arrangement, because this causes the certainty with which the authenticity of the electric circuit arrangement is recognized to be increased.

The same effect is achieved in that, in accordance with a further embodiment of the invention, a sufficiently large number of circuit-technical elements and logic elements of the electric circuit arrangement is included in the concatenation, so that the modified value constitutes a definite authenticity feature.

Advantageously, as described in claim 6, also all circuit-technical and logic elements which are essential for the functioning should be included in the concatenation.

The circuit-technical elements and, advantageously, also the logic elements can be advantageously concatenated serially, as claimed in claim 4, or, as claimed in claim 5, concatenated in an exclusive-OR-operation.

The measure as claimed in claim 7 increases the certainty of recognition in that the modified value is calculated and checked a number of times.

The same advantage is achieved by the embodiment as claimed in claim 8, in that by using a number of random numbers and comparing the modified values generated by these random numbers, an accidentally correct result can be recognized as being false because the other checks yield false modified values.

A concatenation of elements of the electric circuit arrangement as described, for manufacturing purposes, in the opening paragraph can also advantageously be used for the method in accordance with the invention. In this method, however, said concatenation is not used to test whether the electric circuit arrangement functions perfectly, as in the case of the concatenation for the manufacture, but instead it serves here to check whether the circuit is duly constructed, that is whether the circuit is authentic and not a copy.

These and other aspects of the invention will be apparent from and elucidated with reference to the embodiments described hereinafter.

DESCRIPTION OF THE PREFERRED EMBODIMENTS

Figure 1:
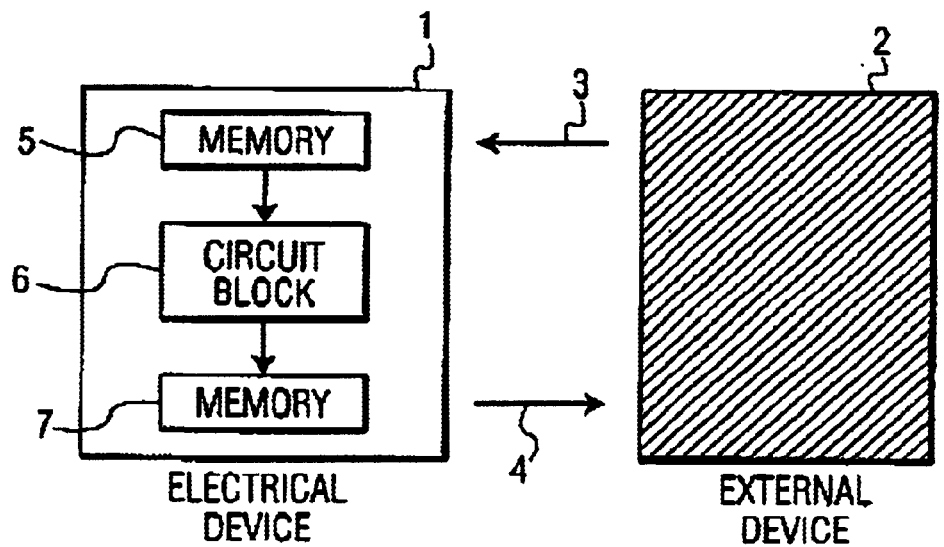
FIG. 1 schematically shows an electric circuit arrangement and an external device between which the data exchange in accordance with the invention takes place.

In FIG. 1, an electric circuit arrangement 1 is symbolically indicated. which circuit arrangement, for example, may be composed of an integrated circuit and accommodated in a card.

FIG. 1 further indicates an external device 2, which may be, for example, a card reader or a card terminal. The electric circuit arrangement 1 may be constructed so as to, for example, allow its user access, via the external device 2, to functions provided in said device.

In the methods in accordance with the state of the art, the external circuit performs a preselected function; the method in accordance with the invention should additionally determine whether the structure of the electric circuit arrangement 1 is unadulterated and hence not an unauthentic copy.

To achieve this, within the device, as many circuit-technical elements as possible, which are accommodated in the electrical device 1, are concatenated. This concatenation differs from the normal arrangement of these elements during normal operation of the circuit. In addition to the circuit-technical elements, also functional elements can be included in this concatenation. It is of the utmost importance for the concatenation that it includes functionally essential elements and that it differs from the arrangement of elements during normal operation of the electric circuit arrangement.

In accordance with the inventive method, a random number is transferred from the external device 2 to the electrical device 1, which is indicated in FIG. 1 by means of the arrow 3. Within the electrical device 1, this random number may optionally be stored temporarily in a memory 5. Following the concatenation, which differs from the arrangement during normal operation and which is indicated in FIG. 1 by means of a circuit block 6, this random number is supplied. This random number is changed by the elements included in the concatenation. For the circuit arrangement and, advantageously, also for the functional elements of the electric circuit arrangement 1, this change is a characteristic change of the random number. Thus, the type of change of the random number is also governed by the structure of the card. The changed, modified random number may optionally be temporarily stored in a memory 7 in the electric circuit arrangement 1 before it is transferred to the external device 2, which is indicated in FIG. 1 by means of an arrow 4.

In a manner which is not indicated in FIG. 1, this modified random number in the external device 2 is compared with a stored check number which is assigned to the random number previously transferred to the external device 2. Only if the modified number and the check number correspond to each other, it may be safely assumed that the electric circuit arrangement 1 is unadulterated and authentic.

This authenticity check of the card may optionally be performed a number of times using a random number. A check may also advantageously be performed by, optionally, successively transferring a plurality of different random numbers to the electrical device 1 and concatenating the re-transferred modified numbers with the respective, assigned check numbers.

Figure 2:
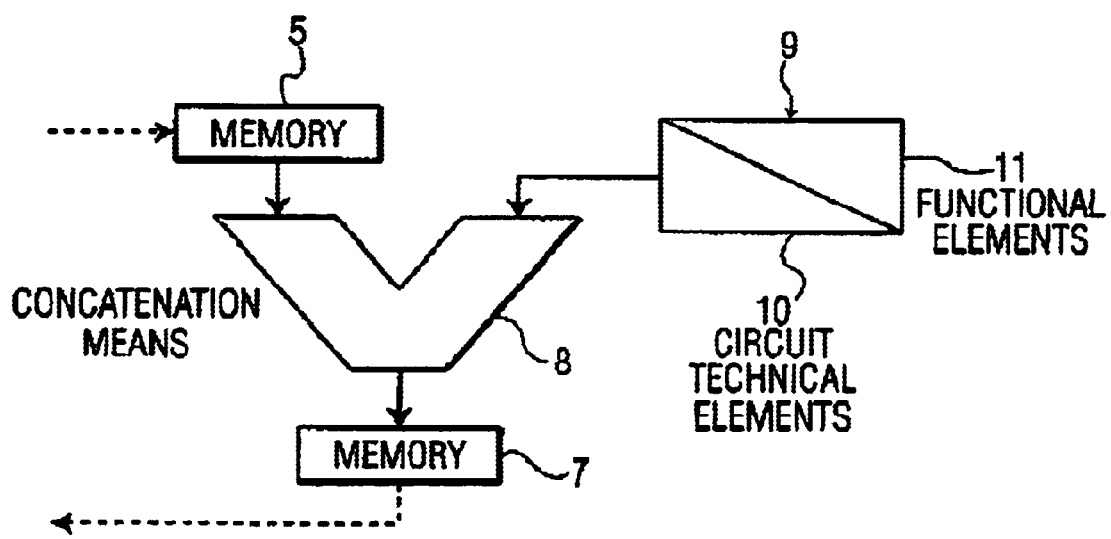
FIG. 2 is a block diagram of the electric circuit arrangement and of the concatenation operation performed therein for the method in accordance with the invention.

In FIG. 2, a coarse block diagram shows how the concatenation operation or the change of the transferred random number in the electrical device 1 shown in FIG. 1 takes place.

The random number transferred by the external device 2 to the electrical device 1 is stored in an intermediate memory 5. Subsequently, this number is supplied to a concatenation means 8 in which elements 9 of the electric circuit arrangement enter. Said elements 9 are composed of circuit-technical elements 10 and functional elements 11. The functional elements 11 may relate to, for example, software-controlled functions. In the concatenation means 8, the elements 10 and 11 are concatenated in a manner which deviates from the normal operation of the electric circuit arrangement. For example, all elements may be arranged in series or concatenated by means of exclusive-OR operations. This concatenation means 8 causes the random number temporarily stored in the memory 5 to be changed in a manner which is characteristic of the circuit arrangement. This modified random number is temporarily stored in the memory 7 and subsequently retransferred to the external device where it is checked in the manner described above.

As a result of the concatenation of the elements 10 and 11 shown in FIG. 2, contrary to the normal function, a characteristic feature of the elements 10 and 11 is generated by the type of change of the random number, which characteristic feature is used as a sign of authenticity in the method in accordance with the invention. Thus, an authenticity check of the electric circuit arrangement 1 is performed independently of its normal mode of functioning. Falsified electric circuit arrangements 1 are generally embodied so that, in their normal function mode, they perform all desired functions in an error-free manner. Such falsified electric circuit arrangements, however, are rarely of exactly the same structure as original circuits. The method in accordance with the invention enables also this structure to be checked, and hence falsified, that is unauthentic electric circuit arrangements 1, can be recognized.

What is claimed is:

1. A method of checking the authenticity of a digital circuit, comprising:

providing a first electrical device, the first electrical device including a first set of software-controlled functions and a first digital circuit, the first digital circuit having a first set of components, and further providing a second digital circuit, the second digital circuit external to the first digital circuit, the first digital circuit having a first data path arrangement, the first data path arrangement associated with a first operating mode, and configured to perform a first logical function with the first set of components;

the first digital circuit communicating with the second digital circuit, and receiving therefrom at least a first digital data;

reconfiguring at least a portion of the first set of software-controlled functions and the first digital circuit so as to perform a second logical function that is different from the first logical function;

performing, by means of the reconfigured first set of software-controlled functions and the reconfigured first digital circuit, one or more operations on the first digital data so as produce a second digital data; and transmitting the second digital data from the first electrical device to the second digital circuit.

2. The method of claim 1, further comprising determining whether the second digital data corresponds to a predetermined check value.

3. The method of claim 2, wherein the first digital data is a random number.

4. The method of claim 2, wherein the first digital circuit is disposed within an integrated circuit and the integrated circuit is disposed within a card; and the second digital circuit is disposed within a terminal that provides access to financial transactions.

5. The method of claim 2, wherein the determination is made within the second digital circuit.

6. The method of claim 1, further comprising receiving a plurality of random numbers, performing, by means of the reconfigured first set of software-controlled functions and the reconfigured first circuit, one or more operations on the plurality of random numbers to produce a plurality of modified numbers, and temporarily storing the modified numbers.

7. The method of claim 6, further comprising transmitting the modified numbers to the second digital circuit.

8. The method of claim 7, further comprising determining whether the modified numbers correspond to predetermined check values.

9. A method of checking the authenticity of a digital circuit, comprising:

receiving, at a first electrical device, the first electrical device including a first set of software-controlled functions and a first digital circuit, the first digital circuit having a first set of components, the first digital circuit having a first data path arrangement, the first data path arrangement associated with a first operating mode, and configured to perform a first logical function, a first digital data from a circuit external to the first digital circuit;

reconfiguring at least a portion of the first set of software-controlled functions and the first digital circuit so as to perform a second logical function that is different from the first logical function;

performing, by means of the reconfigured first set of software-controlled functions and the reconfigured first digital circuit, one or more operations on the first digital data so as produce a second digital data; and transmitting the second digital data from the first electrical device to the circuit external to the first circuit.

* * * * *